United States Patent [19]
Lee

[11] Patent Number: 5,601,212
[45] Date of Patent: Feb. 11, 1997

[54] DISPENSING UNIT FOR A THREADED NECK BOTTLE

[76] Inventor: Gary K. Lee, 5827 S. 81st East Pl., Tulsa, Okla. 74145

[21] Appl. No.: 404,335

[22] Filed: Mar. 15, 1995

Related U.S. Application Data

[63] Continuation-in-part of Ser. No. 227,730, Apr. 14, 1994, Pat. No. 5,524,795.

[51] Int. Cl.$^6$ .......................................................... B67D 5/06
[52] U.S. Cl. ............................ 222/205; 222/207; 222/453
[58] Field of Search ................................. 222/181.2, 205, 222/207, 442, 451, 453, 462, 568

[56] References Cited

U.S. PATENT DOCUMENTS

| | | | |
|---|---|---|---|
| 1,525,828 | 2/1925 | Reeve | 222/453 X |
| 2,216,347 | 10/1940 | Humbard | 222/453 X |
| 2,233,818 | 3/1941 | Matter | 222/453 X |
| 2,248,958 | 7/1941 | Christensen et al. | 222/453 X |
| 2,532,787 | 12/1950 | Romyns | 222/453 X |
| 2,554,570 | 5/1951 | Harvey | 222/207 |
| 2,735,592 | 2/1956 | Stanger | 222/449 |
| 2,772,817 | 12/1956 | Jauch | 222/207 |
| 2,902,250 | 9/1959 | Bering | 251/120 |
| 3,043,483 | 7/1962 | Vogt | 222/207 |
| 3,109,558 | 11/1963 | Yetter | 222/1 |
| 3,134,514 | 5/1964 | Booth | 222/207 |
| 3,141,579 | 7/1964 | Medlock | 222/207 |
| 3,141,580 | 7/1964 | Rogers | 222/213 |
| 3,552,605 | 1/1971 | Hein | 222/207 |
| 3,715,060 | 2/1973 | Benson | 222/207 |
| 4,210,263 | 7/1980 | Bos | 222/453 X |
| 4,249,675 | 2/1981 | Nilson | 222/207 |
| 4,582,230 | 4/1986 | Vierkötter | 222/453 X |
| 4,773,569 | 9/1988 | Larsson | 222/181 |
| 4,828,150 | 5/1989 | Bottger et al. | 222/207 |
| 4,946,075 | 8/1990 | Lundbäck | 222/181 |
| 4,964,544 | 10/1990 | Hanna et al. | 222/181.2 |
| 5,000,353 | 3/1991 | Kostanecki et al. | 222/207 |

FOREIGN PATENT DOCUMENTS

| | | |
|---|---|---|
| 1307772 | 9/1992 | Canada . |
| 436017 | 11/1994 | Sweden . |
| 402328 | 5/1966 | Switzerland . |
| 2119029 | 11/1983 | United Kingdom . |

OTHER PUBLICATIONS

Photocopy of packaging for Unro Dispenser System AB, Universal Dispenser System International Gayle— Sverige, Sweden.

*Primary Examiner*—Joseph Kaufman
*Attorney, Agent, or Firm*—Catalano, Zingerman & Associates

[57] ABSTRACT

A dispenser comprising a condiment supply container, a squeezeable dispensing nipple, and a connector connecting the container and nipple.

14 Claims, 8 Drawing Sheets

DISPENSING UNIT FOR A THREADED NECK BOTTLE

CROSS-REFERENCE TO RELATED APPLICATION

This application is a continuation-in-part of my application Ser. No. 08/227,730, filed Apr. 14, 1994 now U.S. Pat. No. 5,524,795.

BACKGROUND OF THE INVENTION

1. Field of the Invention

This invention relates to apparatus for the dispensing of liquids such as foods and condiments. It relates especially to a special connector connecting a dispensing nipple or tip to a condiment supply container, such as a bottle.

2. Background of the Invention

Condiments such as mustard, ketchup, mayonnaise, and various other sauces are widely dispensed in restaurants and cafes, and especially in the fast food market. Restaurants have various dispensing systems for these condiments, such as ketchup bottles or mustard bottles. Some of these bottles are rigid, and others are plastic where they can be squeezed. Many of the fast food restaurants have the condiments in small plastic packages. When the customer needs ketchup, for example, he tears off a corner of one of these packages, and squeezes the product (such as mustard or ketchup) onto the sandwich. The use of such packages leaves a lot to be desired, e.g. they are very messy and also they waste a lot of the condiment being dispensed.

There have been various schemes developed to try to overcome these objections and develop more efficient condiment dispensers. However, none of these are widely accepted. For example, one such system is shown in U.S. Pat. No. 4,773,569 entitled: "Dispenser for Pasty Matter" issued to Uno Larsson Sep. 17, 1988. That patent shows a container such as a bottle with a neck portion to which is attached a plastic dispenser tip. When the device is hung upside down, the condiment in the container flows into the dispensing tip which has a valve mechanism such that no fluid flows out the end of the tip until pressure is applied by squeezing the plastic tip. The valve system described therein was not entirely satisfactory for some commercial use.

SUMMARY OF THE INVENTION

This invention includes a novel connector for connecting a condiment dispensing nipple to a condiment supply or storage bottle. The dispensing nipple is a squeezeable plastic mostly cylindrical shape with one end in a converging shape. The lower end of the converging end is open so the condiment escapes when the nipple is squeezed. A double valve is provided inside the nipple. It includes a long rod with a ball valve at the bottom for seating in the converging end of the nipple. The other end of the rod is provided with a larger truncated cone shape to serve as a valve against a seat on the connector. The condiment supply bottle has at one end a threaded neck on which a cap is placed when it is in storage. The other end, or bottom, of the bottle is provided with a recloseable hole with a reuseable closing plug which is attached to the bottle.

A connector is used to connect the neck of the bottle to the dispensing nipple. The connector includes outer and inner concentric cylinders which are secured to and made an integral part of an annular ring which has an outside diameter and an inside diameter about the same diameter as the first and second concentric cylinders respectively. The annular ring seals one end of the annular volume or space between the concentric cylinders.

The inside of the outer cylinder is provided with threads for threadably receiving the top of the dispensing nipple from the bottom side or side of the cylinder away from the annular ring. The inside of the inner cylinder is provided with internal threads to threadably receive the threaded neck of the storage bottle inserted from the side of the annular ring away from the concentric cylinders.

The lower end of the internal concentric cylinder is provided with a seat which mates with the truncated cone valve on the end of the long rod within the dispensing nipple. Thus when the condiment bottle is turned such that the neck is up in regard to the direction of the pull of gravity, the valve seat cooperates with the internal valve of the dispensing nipple to close the internal cylinder.

In operation, the connector is positioned between the condiment storage bottle and the dispensing nipple. Then the condiment storage bottle can be suspended upside down and the reinsertable plug is removed from the hole in the bottom. When this occurs, the condiment flows past the valve seat and truncated cone valve into the dispensing nipple. The bottom valve seats within the converging end of the nipple and prevents flow of condiment out. When it is desired to dispense condiment upon food, the dispensing nipple is squeezed. This forces the truncated valve up and moves the ball valve away from the converging end. This causes the condiment to flow out the open end of the converging end.

When one wishes to replace the storage bottle or place it in storage, all one has to do is reinsert the plug in the hole and turn the bottle right side up. Then, one unscrews the dispensing nipple and removes it from the storage bottle. This leakproof seal is permitted by the truncated cone valve in the dispensing nipple sealing against the valve seat attached to the inner concentric cylinder.

A modified connector includes an annular raised seal on its bottom surface around the edge of the center passage of the connector. When the storage bottle is screwed into the connector, the annular raised seal contacts a ring molded into its neck. As the storage bottle is tightened into the connector, the annular raised seal cuts into the ring on the storage bottle, thereby creating a seal to prevent leakage of fluid from the storage bottle around the connector and down the sides of the dispensing nipple.

A modified dispensing nipple includes a shortened rod connecting a semi-spherical ball valve and a truncated cone shaped member. The truncated cone shaped member acts as a valve only when the dispensing nipple is in the inverted position such as to replace an empty storage bottle. The truncated cone shaped member of the modified nipple does not act as a valve during operation when the dispensing nipple is squeezed. In this way, the flow of fluid from the storage bottle into the dispensing nipple is continuous during operation.

In the modified dispensing nipple, additional weight is provided for the valve sealing the converging end of the dispensing nipple in order to provide a proper seal. A weighted portion is provided on the top surface of the truncated cone member and an additional weighted portion is provided on the rod adjacent the semi-spherical ball valve. In addition to the added weight, the internal surface of the converging end of the dispensing nipple is provided with a plurality of annular ridges which contact the semi-spherical valve member in order to provide sealing surface to prevent fluid from leaking.

While I have referred to condiments, other liquids such as soap, can be dispensed with this system.

It is an object of this invention to provide a novel and improved system for dispersing condiments or other liquid like material.

It is a specific object of this invention to provide a new and improved connector between a dispensing nipple and a condiment storage bottle or container. Various other objects and a better understanding of the invention can be had from the following description taken in conjunction with the drawings.

DETAILED DESCRIPTION OF THE PREFERRED EMBODIMENT

Figures 1, 7:
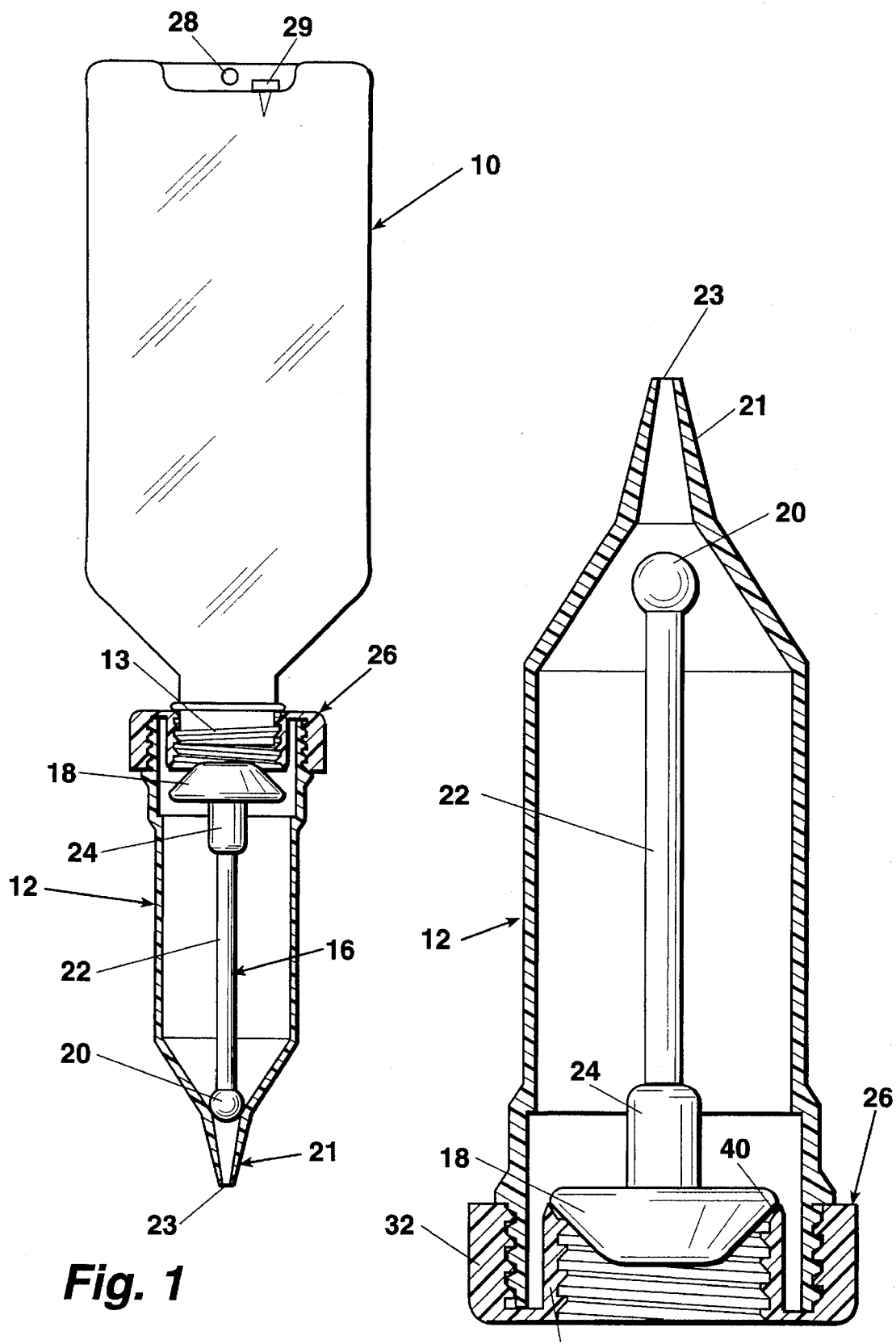
FIG. 1 shows an upside down condiment container, a dispensing nipple, and a connector connecting the two.
FIG. 7 shows the dispensing unit of FIG. 2 inverted.
Figure 3:
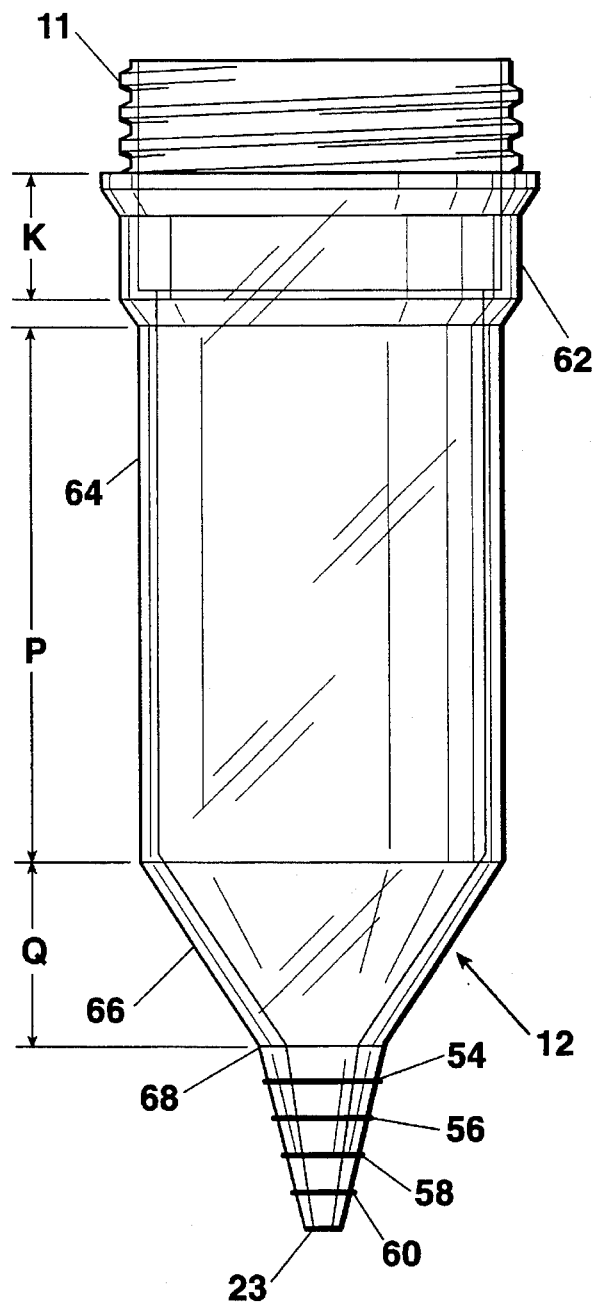
FIG. 3 shows the plastic dispensing nipple.

Attention is first directed to FIG. 1 which shows a condiment container 10 and a dispensing nipple 12 which is connected to the container by connector 26. The container 10 is preferably one described in co-pending U.S. patent application, Ser. No. 08/146,405, filed Nov. 2, 1993, by Gary Lee. As shown in FIG. 3, flexible and/or squeezable dispensing nipple 12 has external threads 11 at the upper end. As shown in FIG. 1, the neck of container 10 is provided with threads 13.

Also shown in FIG. 3 are guide lines 54, 56, 58, and 60. This makes for quick adjustments for different condiments by cutting back the dispenser tip on these guide lines or ridges. The more you shave or cut off, the larger the hole becomes, and the larger the chunky or lumpy condiments that can be accommodated.

Figure 8:
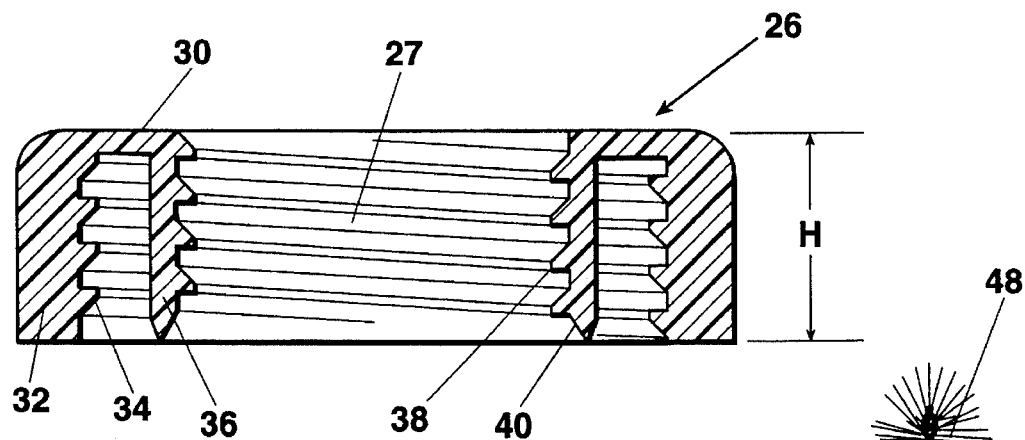
FIG. 8 is an enlarged view in section form showing the connector between the condiment container and the dispensing nipple.
Figure 9:
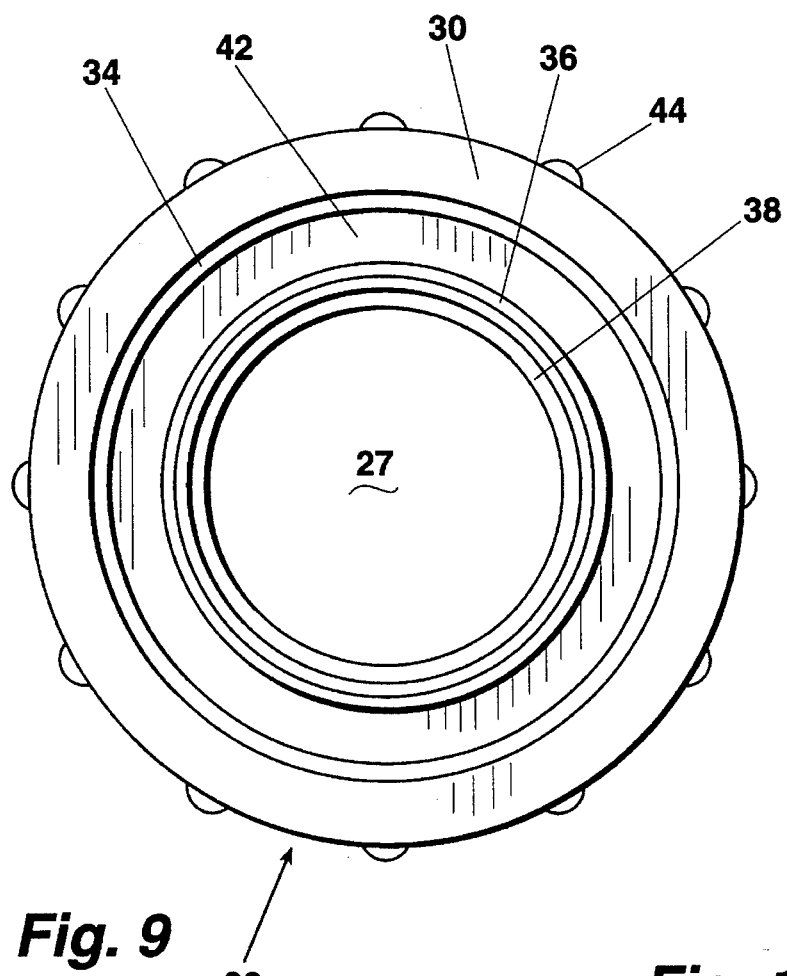
FIG. 9 is a top view of FIG. 8.

Attention is next directed to FIG. 8 which shows a vertical cross-section of connector 26. This connector has two concentric cylinders 32 and 36 with an annular space 42 therebetween. An annular plate 30 closes the space 42 at the upper end thereof when in the position shown in FIG. 8. Outer concentric cylinder 32 is provided with internal threads 34, and inner concentric cylinder 36 contains internal threads 38. As shown in FIG. 1, the internal threads 38 of inner cylinder 36 receive the threads 13 of container 10. Likewise, the internal threads 34 of outer concentric cylinder 32 threadably receive the external threads 11 at the large end of the dispensing nipple 12. The lower end of inner cylinder 36 has a valve seat 40.

Figures 2, 6:
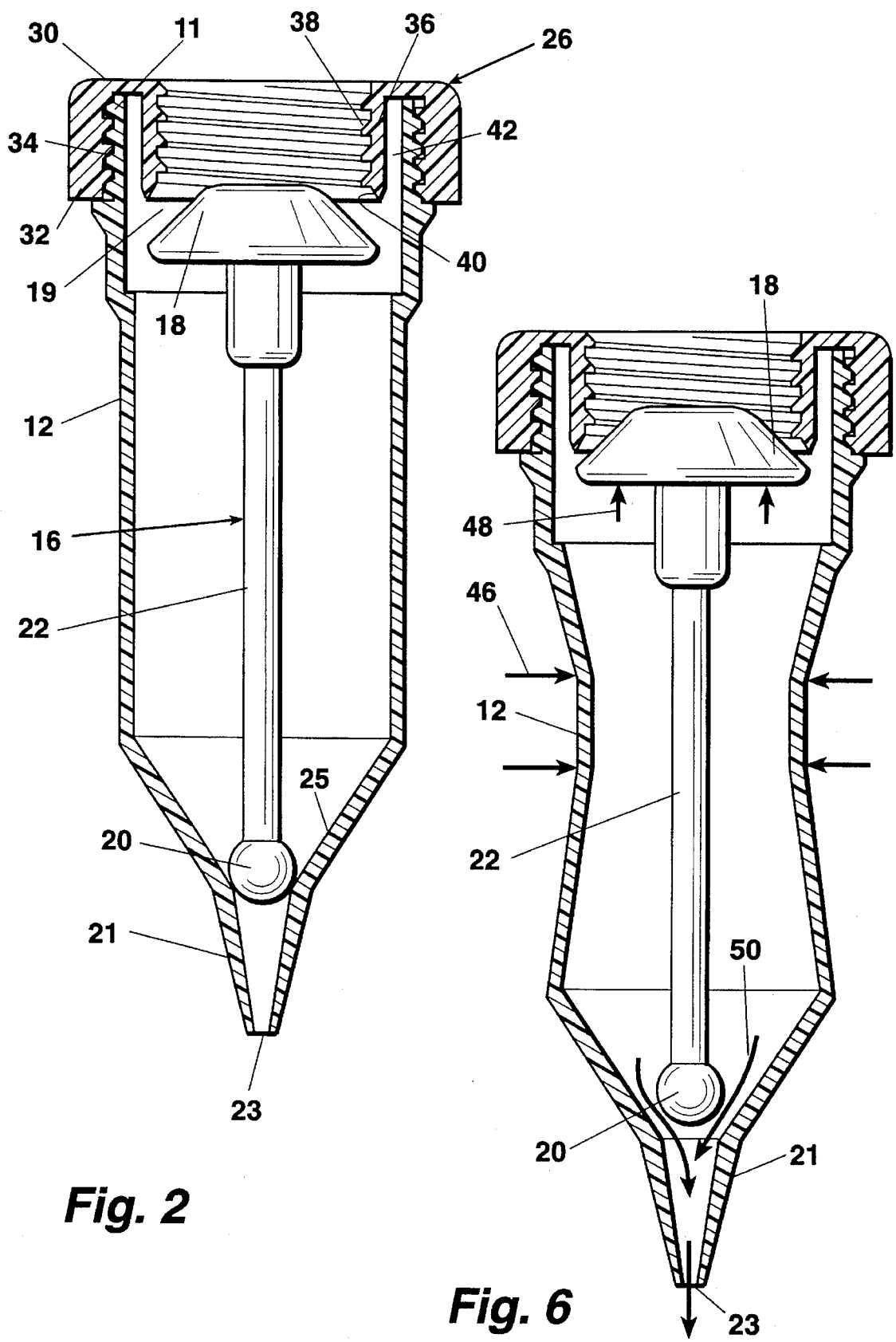
FIG. 2 is an enlarged view of the connector and dispensing nipple shown in FIG. 1.
FIG. 6 is similar to the view of FIG. 2 except that pressure has been exerted on the wall of the dispensing nipple.
Figure 4:
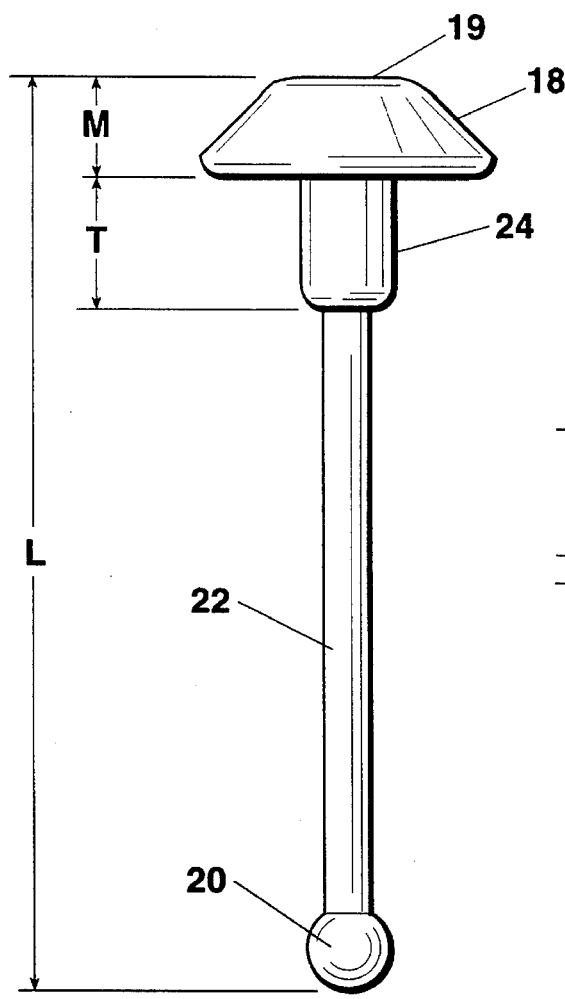
FIG. 4 shows the valve used with the dispensing nipple of FIG. 3 and includes a ball valve, a truncated cone valve, and a rod connecting the two.
Figure 5:
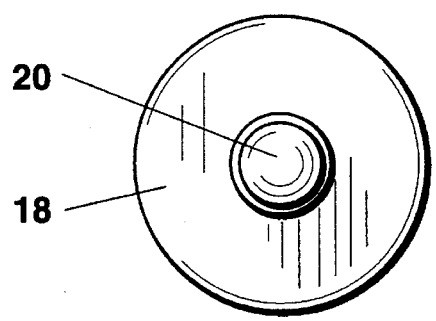
FIG. 5 is a end view of the valves of FIG. 4.

Attention is next directed to FIGS. 2 and 4. FIG. 4 shows the double headed valve 16. It is provided with a ball valve 20 which, as shown in FIG. 2, seats with the internal wall 25 to prevent the flow of fluids from within dispensing nipple 12 when the device is not operated to dispense such fluid. The upper end of the valve 16 is provided with a valve 18 which essentially takes the shape of a truncated cone having a planar top 19. Stem 22 connects ball valve 20 and valve 18. Below the truncated valve 18 is enlarged section 24 of stem 22 which adds weight to the valve so that it will improve its function. The valve 18 seats against seat 40 which is supported by the inner concentric cylinder 36. As shown in FIG. 7, when the unit is turned upside down, the valve 18 seats on seat 40 of the inner concentric cylinder and prevents fluids from escaping from within the dispenser nipple.

Seat 40 of the connector as shown in FIG. 8 is made with angle of about 40° with a plane perpendicular to the axis of the connector. This seat 40 is designed in conjunction with valve 18 so that valve 18 will form a good seal with seat 40.

Attention will now be directed toward using the device of this invention. The condiment bottle 10 has a planar side or bottom upon which it may sit and a neck at the other end. When the bottle is sitting on its bottom, it is said to be in the upright position. When in its upright position, the cap of the bottle 10 is removed and the dispensing unit shown in FIG. 2 connected onto the upright bottle. The container 10 preferably has threads 13 which are threadably received by threads 38 of inner cylinder 36 of the connector shown in FIG. 8. After the dispensing unit of FIG. 2 is connected to container 10, the whole assembly is inverted and is hung as by hole 28.

When in the position shown in FIG. 1, ball valve 20 seats against the inner wall 25 of the converging end of the nipple 12. This prevents any flow of condiment out of the nipple.

The condiments contained in container 10 will normally flow through the neck of the container and through the space 19 between the valve 18 and the seat 40. This space should be big enough to permit flow of the particular condiment or other fluids which may be in container 10. The nipple 12 is thus filled by gravity. During this time the ball valve 20 is seated against the wall 25 of the converging portion of the nipple 12. When the container is hung in the position shown in FIG. 1, there is a removeable plug 29 in the bottom of the planar side of the container 10 near hole 28 which is removed. This permits air flow out and permits the fluid to flow downwardly easily. Sometimes one may be in a hurry to fill the nipple 12. In that case, before screwing the container 10 into a connector 26, one can merely take off the cap of container 10 and pour the fluid, such as ketchup, mustard, etc. through the center passage 27 of connector 26 when the connector is in the position shown in FIG. 2. The fluid will then flow through the space 19 between valve 18 and seat 40. This arrangement is such that there is ample space between space 19 to permit the flow of the fluid. Then, when the nipple 12 is filled, the container 10 is set on its planar surface with the neck upwardly, and the device of FIG. 2 is then turned upside down or inverted from that position to the position shown in FIG. 7. Here it shows that the valve 18 rests on seat 40, and no fluid can escape the filled nipple 12. The apparatus of FIG. 7 is then placed on the threads 13 of the container 10 while the container 10 is in its upright position. Once the apparatus shown in FIG. 7 is screwed on, the container and the apparatus can be inverted to the position shown in FIG. 1. The apparatus of this invention is now ready to be hung by hole 28. One then places one's hot dog or whatever one may wish to have the condiment applied to beneath the opening 23 of the converging end 21. Then the walls of the container 12 are squeezed as indicated in FIG. 6 by arrows 46. This causes the ketchup or whatever may be in there to force the valve 18 upwardly as shown by arrows 48. This raises the ball 20 off of the converging walls 25, and then the fluid or ketchup flows in the path indicated by arrows 50 where is exits the opening 23. The size of nipples 12 is such that one squeeze will normally give all of the condiment that the customer desires. If more is desired, all the customer needs to do is relax his grip, and the condiment will flow downwardly as described above with regard to FIG. 2, and then a second squeeze will permit the second serving of the condiment. When pressure is released, the valve 20 drops to seal against wall 25 of the converging end.

If one were to store the condiments while still in the system as shown in FIG. 1, as at the end of the day, one can either hang the entire dispensing system in a refrigerator or other place in the position shown in FIG. 1. Or, if desired, one can remove and invert the dispensing system of FIG. 1 and remove the device shown in FIG. 7 which when in that position, valve 18 is seated on seat 40 and fluid cannot leak out. The bottle cap can be put back on the container, and the container stored.

Figure 10:
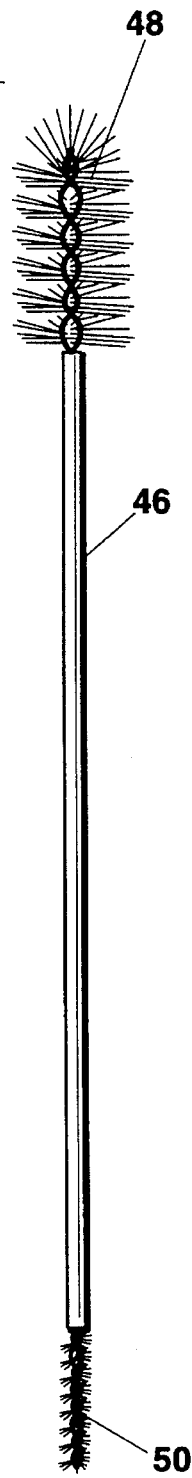
FIG. 10 illustrates a brush useful for cleaning the internal threads of the connector.

It is quite easy to clean the device of this invention. As shown in FIG. 2, all one has to do after container 10 has been removed is remove connector 26 from the nipple section 12 and remove connected valve 18 and ball valve 20. After removing the connector 26 from the nipple, the nipple can be washed with a brush and suitable cleansing fluid. The connector 26 shown in FIG. 8 can be cleaned in a similar fluid while using the brush of FIG. 10. The brush of FIG. 10 is designed so that brush head 50 can go into the space 42 between the concentric cylinders 32 and 36. The other end of the brush 48 can be used to clean the threads 38.

The dispensing apparatus of FIG. 2 has been built. Typically, the connector 26 is made of F.D.A. approved thermoplastic, the nipple 12 made of F.D.A. approved elastomeric plastic, and the dual valving (18, 20, 22) is made of F.D.A. approved thermo-plastic. One device that was built the following are the dimensions:

| Connector 26 | |
|---|---|
| Outside diameter of outer concentric cylinder 32 | 2.44" |
| Inside diameter of outer concentric cylinder 32 | 2.06" |
| Outside diameter of inner concentric cyclinder 36 | 1.6875" |
| Inside diameter of inner concentric cyclinder 36 | 1.27" |
| Height "H" of connector 26 | .78" |
| Valve 16 of FIG. 4 | |
| Length "L" of valve of FIG. 4 | 4.825" |
| Radius of valve 20 | .234" |
| Diameter of rod 22 | .160" |
| "M" of valve 18 | .532" |
| Diameter of enlarged section 24 | .4375" |
| Length "T" of enlarged section 24 | .625" |
| Nipple 12 of FIG. 3 | |
| Diameter of section 62 | 1.875" |
| Diameter of section 64 | 1.75" |
| Length "K" of section 62 | .59357" |
| Length "P" of section 12 | 2.46875" |
| Length "Q" of section 66 | .875" |
| Diameter at 68 | .625" |
| Diameter at 56 | .4375" |
| Diameter at 60 | .25" |
| Average thickness at wall of nipple 12 | .09375" |

Figure 11:
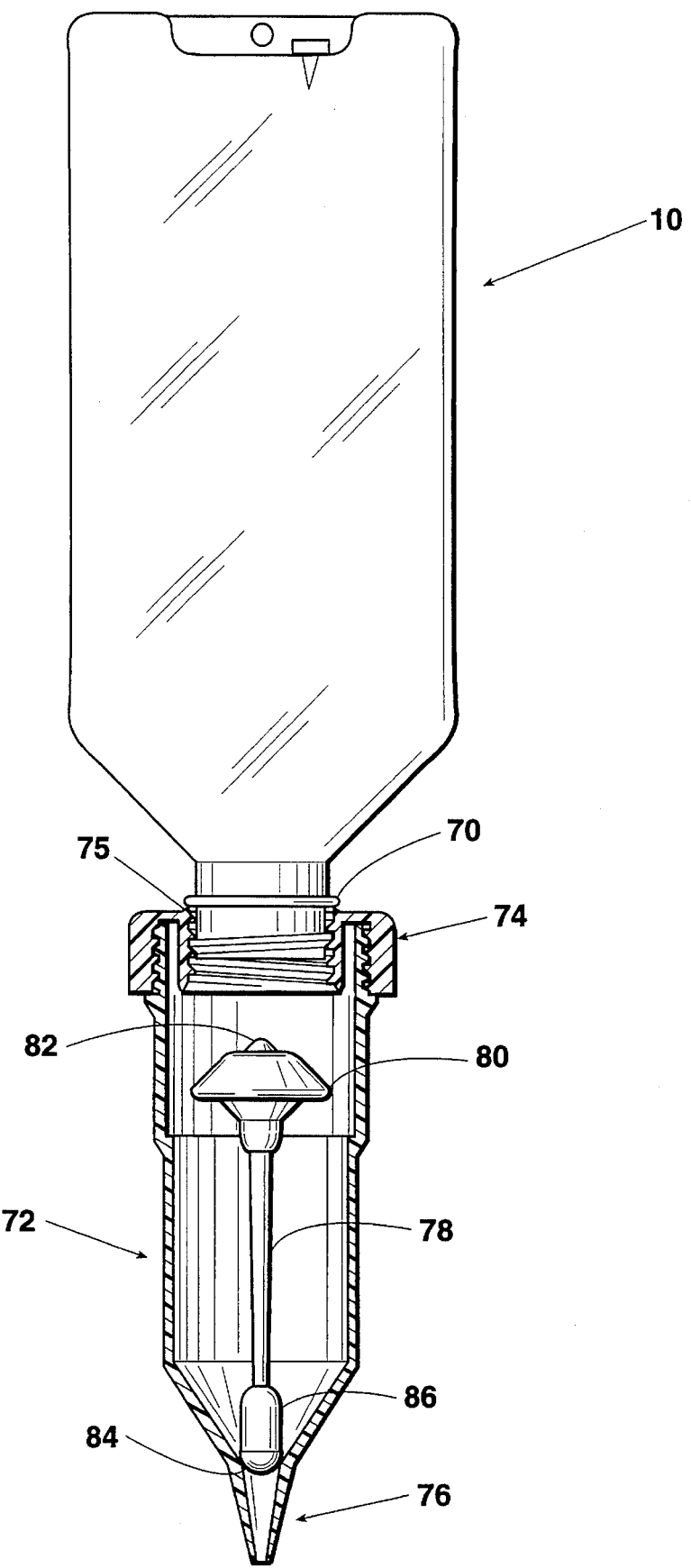
FIG. 11 shows an upside down condiment container, a modified dispensing nipple, and a modified connector connecting the two.
Figure 17:
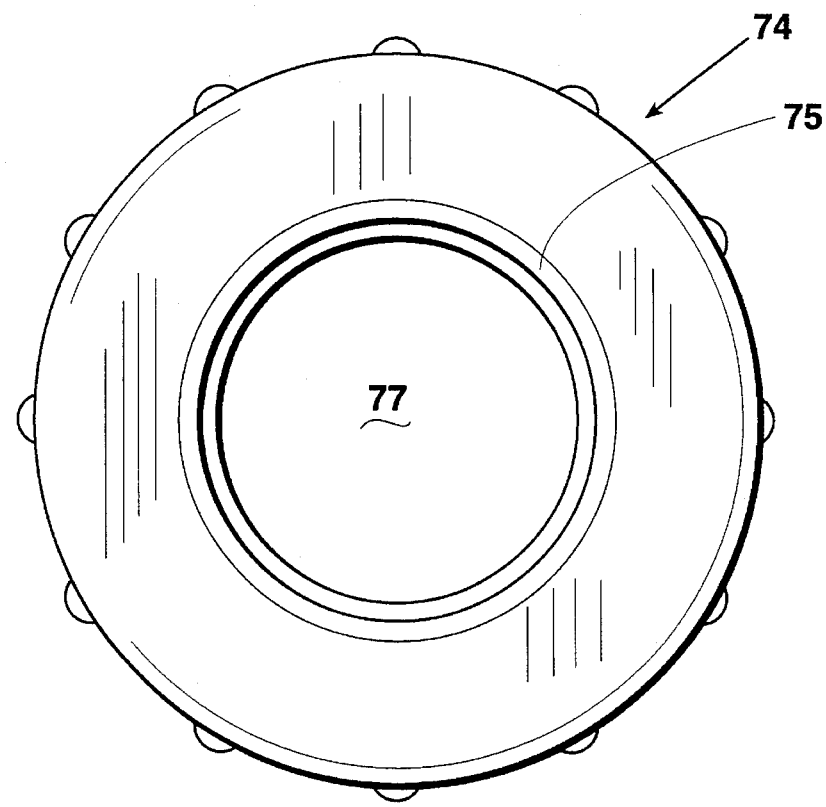
FIG. 17 is a bottom view of FIG. 16.
Figure 16:
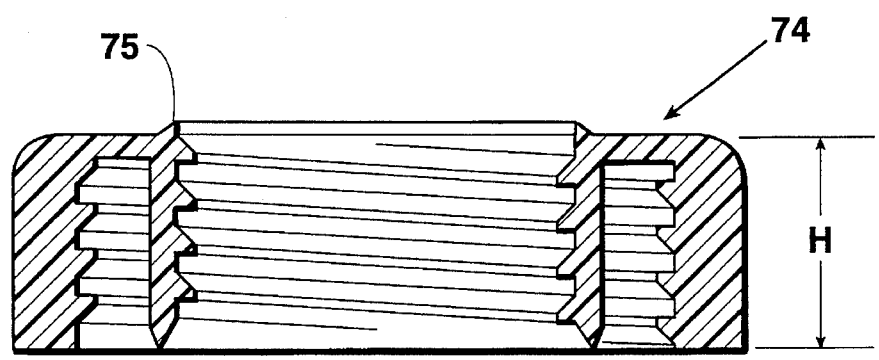
FIG. 16 is an enlarged view in section form showing the connector between the condiment container and the dispensing nipple.

A modified dispensing nipple and modified connector help prevent fluid from leaking from the system. In addition, it has been found that a dispensing nipple that provides continuous flow of fluid with a single squeeze is desireable. Referring to FIG. 11, storage bottle 10 includes a ring 70 molded into its neck. This ring 70 interacts with an annular raised seal 75 of modified connector 74. Annular raised seal 75 of modified connector 74 can be seen in greater detail in FIGS. 16 and 17. FIG. 16 is a vertical cross-section of modified connector 74 and FIG. 17 depicts a bottom view of modified connector 74. Annular raised seal 75 of FIG. 16 is molded into modified connector 74 and tapers to a point extending away from modified connector 74. As can be seen in FIG. 17, annular raised seal 75 encircles the edge of central passage 77 of modified connector 74.

Referring again to FIG. 11, in operation, the neck of storage bottle 10 is screwed into modified connector 74, the annular raised seal 75 of modified connector 74 contacts ring 70 of storage bottle 10. As storage bottle 10 is tightened into modified connector 74, the point of annular raised seal 75 cuts into ring 70. When annular raised seal 75 cuts into ring 70, a seal is formed in addition to the threaded connection between storage bottle 10 and modified connector 74. This additional seal helps prevent fluid from leaking around modified connector 74 and modified nipple 72 when the storage bottle, modified connector, modified nipple system is inverted for usage as in FIG. 11 or turned upright for storage or replacement of storage bottle 10.

Figure 12:
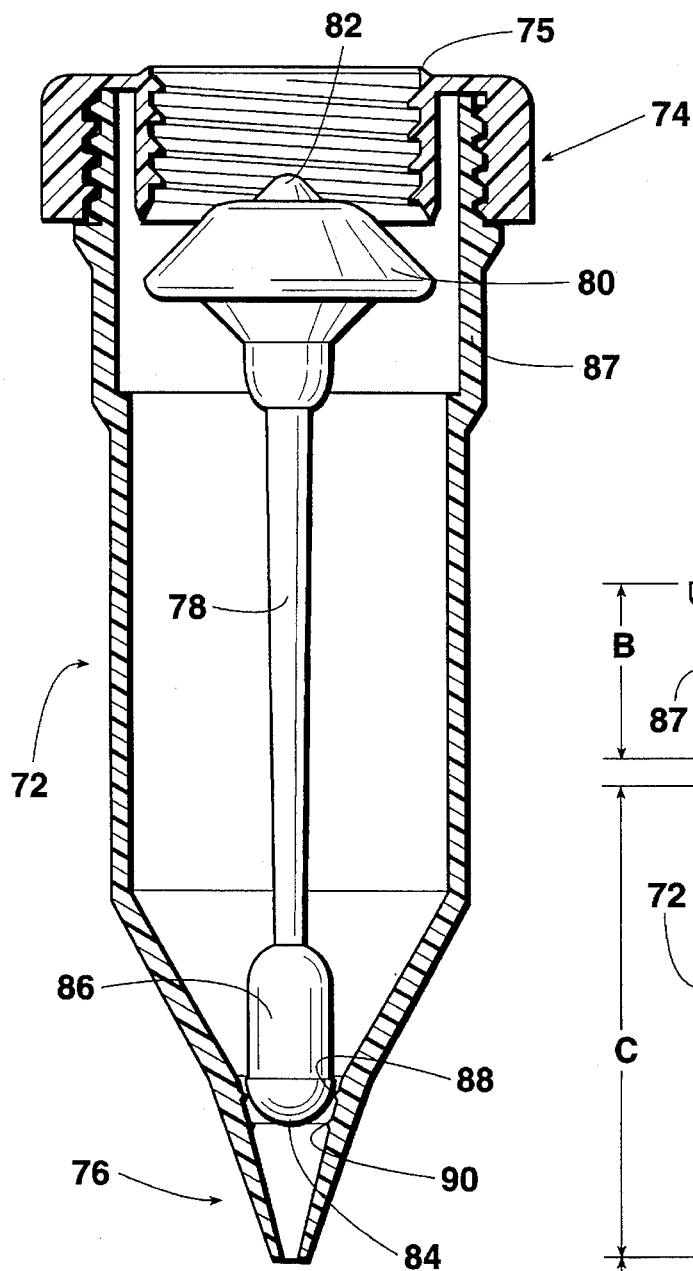
FIG. 12 is an enlarged view of the modified connector and modified dispensing nipple shown in FIG. 11.

Referring to FIG. 12, the interior circumference of tip 76 includes a plurality of annular ridges 88 and 90. Annular ridges 88 and 90 act in combination with semi-spherical valve 84 in order to provide multiple sealing surfaces to prevent fluid from leaking from tip 76 when modified dispensing nipple 72 is in its resting position. Semi-spherical valve 84 has a very smooth and uniform surface in order to provide a precise seal against annular ridges 88 and 90.

Figure 15:
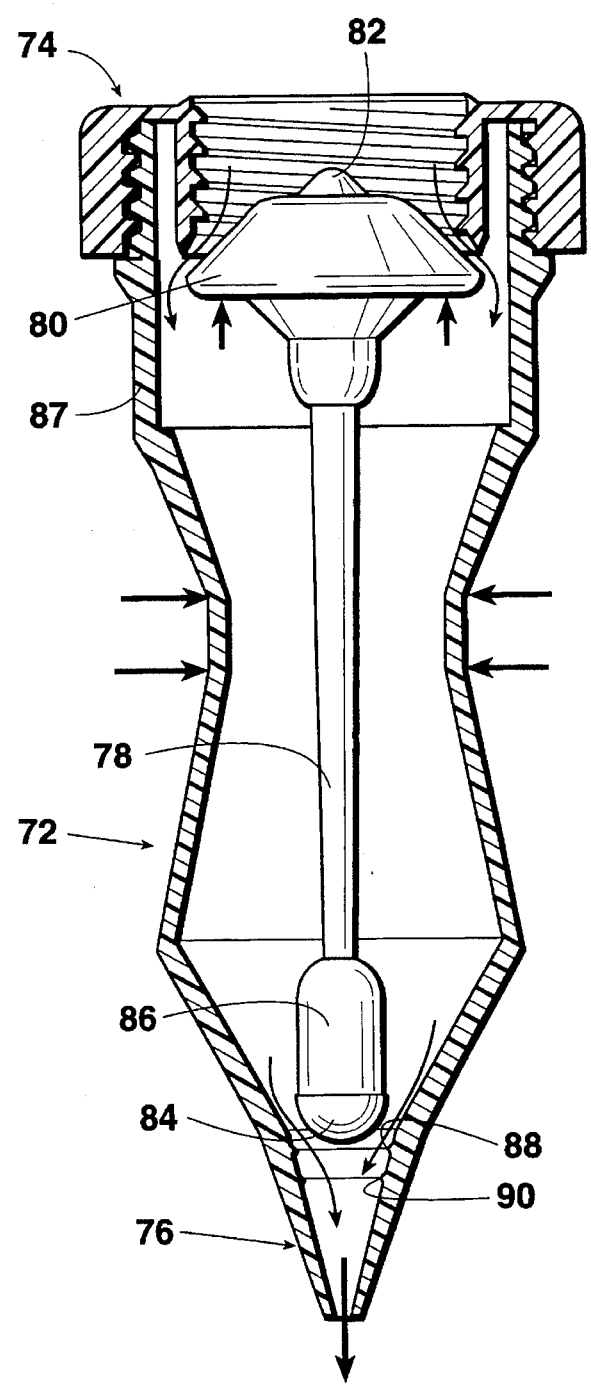
FIG. 15 is similar to the view of FIG. 12 except that pressure has been exerted on the wall of the dispensing nipple.

Modified dispensing nipple 72 includes a rod 78 which is shorter than rod 22 of FIG. 2. Rod 78 connects a truncated cone shaped member 80 and a semi-spherical ball valve 84. Truncated cone shaped member 80 acts as a valve only when modified dispensing nipple 72 is in the inverted position such as for storage or for replacement of an empty storage bottle 10. Truncated cone shaped member 80 does not act as a valve during operation when modified dispensing nipple 72 is squeezed. In this way, the flow of fluid from the storage bottle into modified dispensing nipple 72 is continuous during operation. Referring to FIG. 15, when the walls of the nipple 72 are squeezed, the fluid in modified dispensing nipple 72 forces the truncated cone shaped member 80 upwardly but not in contact with connector 74. This raises semi-spherical ball valve 84 off of annular ridges 88 and 90 to allow fluid to exit tip 76 but does not prevent fluid from entering dispensing nipple 72. While modified dispensing nipple 72 is squeezed, fluid continues to flow through connector 74, around truncated cone shaped member 80, through dispensing nipple 72 and exits from tip 76. The forces of gravity upon the fluid maintain a constant flow of fluid from storage bottle 10, through modified connector 74 and modified dispensing nipple 72 during time nipple 72 is squeezed. In this way, the user is able to obtain the desired amount of fluid from a single squeeze of nipple 72.

Once the squeezing force is released from modified dispensing nipple 72 it returns to its resting position. The forces of gravity continue to act upon the fluid which forces truncated cone shaped member 80 downward since the forces of the fluid within nipple 72 cease to act upon the underside of truncated cone shaped member 80. When truncated cone shaped member 80 is forced down, rod 78 forces semi-spherical valve 84 into contact with annular ridges 88 and 90 to seal tip 76 thereby preventing fluid from exiting. The forces of gravity upon truncated cone shaped member 80 assist in maintaining a good seal of semi-spherical valve 84 with annular ridges 88 and 90.

Figure 14:
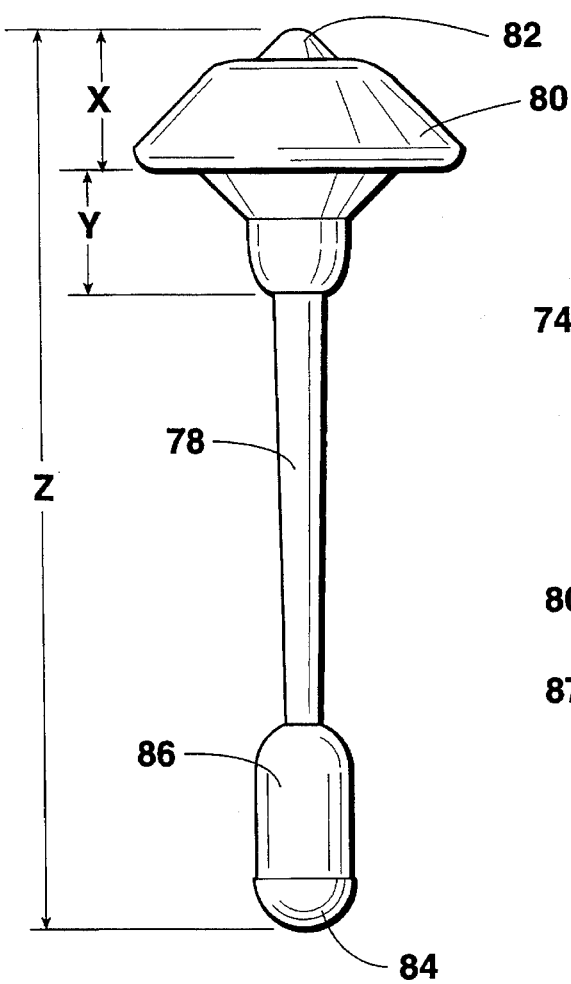
FIG. 14 shows the valve used with the dispensing nipple of FIG. 13 and includes a semi-spherical ball valve, a truncated cone member including a weighted portion thereon, and a rod connecting the semi-spherical ball valve and truncated cone member.

In addition to the forces of gravity acting upon the fluid forcing truncated cone shaped member 80 downward, weight has been added to rod 78 so that semi-spherical valve 84 seats properly on annular ridges 88 and 90. Referring to FIG. 14, a weighted portion 82 is provided to the top surface of truncated cone member 80. A second weighted portion 86 is provided on rod 78 adjacent to semi-spherical ball valve 84.

Figure 13:
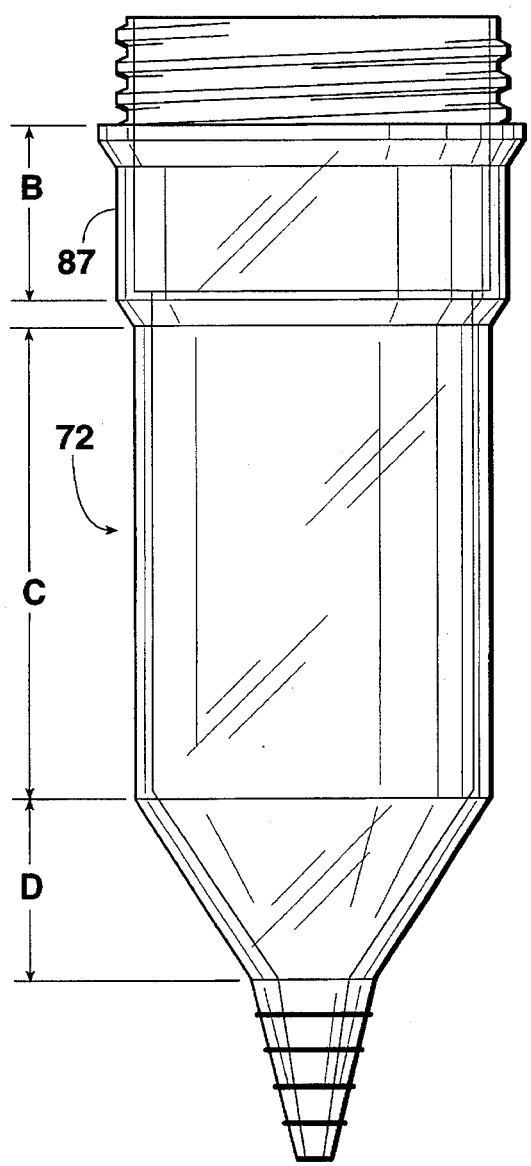
FIG. 13 shows a modified dispensing nipple.

Length "B", FIG. 13, of the large part 87 of modified dispensing nipple 72 is longer than length "K" of large part 62 of nipple 12. This is to accommodate the shorter length rod 78 of the modified dispensing nipple 72, FIG. 12.

A modified dispensing nipple and a modified connector were built having the following dimensions:

| Modified Valve 79 of FIG. 14 | |
| --- | --- |
| Length "Z" of valve 79 of FIG. 14 | 4.875" |
| Radius of semi-spherical valve 84 | .234" |
| "X" of truncated cone member 80 | .750" |
| Length "Y" of enlarged section 81 | .438" |
| Modified Nipple 72 of FIG. 13 | |
| Diameter of section 88 | 1.875" |
| Diameter of section 89 | 1.75" |
| Length "B" | .750" |
| Length "C" | 2.46875" |
| Length "D" | .875" |

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A dispensing unit for use with a bottle having an externally threaded neck and a ring molded into its externally threaded neck, comprising:

a hollow flexible nipple having,
   (1) a converging end,
   (2) an enlarged externally threaded end portion; and
   (3) a generally cylindrical body connected between said converging end and said enlarged externally threaded end portion;
   (4) a plurality of annular ridges in said converging end;

an integral connector having,
   (a) an annular ring having an inner diameter and an outer diameter an upper surface and a lower surface;
   (b) an outer cylinder section of about the same diameter as said outer diameter made integral with said annular ring and having internal threads to receive the enlarged external threaded end portion of said nipple;
   (c) an inner cylindrical section integral with said annular ring and having internal threads to receive said threaded neck, the diameter of said inner cylinder being about the same as the inner diameter of said cap;
   (d) an annular seating surface supported by said inner cylindrical section and facing away from said annular ring;

a plunger having a rod and a semi-spherical ball valve at one end for seating in said converging end of said nipple and a truncated cone shaped member at the other.

2. A dispensing unit as defined in claim 1 in which said truncated cone shaped member has a top surface and a bottom surface and includes a weighted portion on said top surface.

3. A dispensing unit as defined in claim 1 in which said rod includes a weighted portion adjacent said semi-spherical ball valve.

4. A dispensing unit as defined in claim 1 in which said bottle has a closeable opening in its end opposite said neck.

5. A dispensing unit as defined in claim 1 in which said semi-spherical ball valve has a smooth and uniform surface with which to seal against said plurality of annular ridges.

6. A dispensing unit as defined in claim 1 in which said connector includes means for cutting into the ring of the bottle.

7. A dispensing unit as defined in claim 1 in which said lower surface of said annular ring includes an annular raised seal for cutting into the ring of the bottle.

8. A dispensing system for use with a bottle having fluid therein and an externally threaded neck and a ring molded into its externally threaded neck, comprising:

a hollow flexible dispensing nipple adapted to be dependent from the bottle and filled with fluid from the bottle having;
   (1) a converging end terminating at a tip;
   (2) an enlarged externally threaded end portion;
   (3) a generally cylindrical body connected between said converging end and said enlarged externally threaded end portion;
   (4) a plurality of annular ridges in said tip;

an integral connector having;
   (a) means for releasably securing said connector to the neck of the bottle;
   (b) means for releasably securing said connector to said dispensing nipple;

a plunger disposed in said dispensing nipple having a rod and a semi-spherical ball valve at a first end for seating in said plurality of annular ridges in said tip and a truncated cone shaped member at a second end;

said semi-spherical ball valve being adapted for opening and closing said tip;

said truncated cone shaped member being adapted to be influenced by the fluid pressure in said dispensing nipple by squeezing thereof so as to open said tip by unseating said semi-spherical valve from said annular ridges but not to contact said connector so that the flow of fluid from the bottle into said dispensing nipple is uninterrupted;

upon release of the squeezing pressure on said dispensing nipple the fluid pressure on said truncated cone shaped member ceases and said semi-spherical valve seats in said plurality of annular ridges in said tip.

9. A dispensing system according to claim 8 wherein said means for releasably securing said connector to said dispensing nipple includes an annular ring having;

(a) an inner diameter and an outer diameter an upper surface and a lower surface;

(b) an outer cylinder section of about the same diameter as said outer diameter made integral with said upper surface of said annular ring and having internal threads to receive the enlarged external threaded end portion of said nipple.

10. A dispensing system according to claim 9 wherein said means for releasably securing said connector to the neck of the bottle includes:

(a) an inner cylindrical section integral with said annular ring and having internal threads to receive the externally threaded neck.

11. A dispensing system according to claim 10 wherein said lower surface of said annular ring includes an annular raised seal for cutting into the ring of the bottle.

12. A dispensing unit as defined in claim 8 in which said semi-spherical ball valve has a smooth and uniform surface with which to seal against said plurality of annular ridges.

13. A dispensing unit as defined in claim 8 in which said truncated cone shaped member has a top surface and a bottom surface and includes a weighted portion on said top surface.

14. A dispensing unit as defined in claim 13 in which said rod includes a weighted portion adjacent said semi-spherical ball valve.

* * * * *